United States Patent [19]

Büngert

[11] Patent Number: 4,536,104
[45] Date of Patent: Aug. 20, 1985

[54] PIPE DIVIDER FOR PIPES CONVEYING SOLIDS

[75] Inventor: Theodor Büngert, Wiesbaden, Fed. Rep. of Germany

[73] Assignee: Hoechst Aktiengesellschaft, Frankfurt am Main, Fed. Rep. of Germany

[21] Appl. No.: 579,515

[22] Filed: Feb. 13, 1984

[30] Foreign Application Priority Data

Feb. 14, 1983 [DE] Fed. Rep. of Germany ....... 3305078

[51] Int. Cl.$^3$ .............................................. B65G 53/56
[52] U.S. Cl. .............................. 406/183; 137/561 A; 137/883; 406/181
[58] Field of Search ................... 406/181, 183, 11; 137/808–813, 883, 561 A

[56] References Cited

U.S. PATENT DOCUMENTS 2,287,663  6/1942  Newcum ........................ 137/883 X
2,793,083  5/1957  Oetiker ............................ 406/11
3,513,865  5/1970  van der Heyden ................ 137/813
3,929,379  12/1975  Krambrock ......................... 406/95

FOREIGN PATENT DOCUMENTS 1243096  6/1967  Fed. Rep. of Germany ...... 406/181

Primary Examiner—Jeffrey V. Nase
Attorney, Agent, or Firm—Schwartz, Jeffery, Schwaab, Mack, Blumenthal & Evans

[57] ABSTRACT

Disclosed is a pipe divider for use in pipes intended for conveying solids of small particle size, constructed in such a way that a feed pipe leads into a cylindrical distributor chamber and two distributor pipes, each having a shut-off means, lead away from this chamber. In preferred embodiments, the cylindrical distributor chamber has continuous, inwardly-curved weirs around the outlet points to the distributor pipes, and a distributor pipe leads away from each of the two end faces of the cylindrical distributor. This special arrangement results in a low mechanical and/or corrosive stress on the functional components.

9 Claims, 3 Drawing Figures

PIPE DIVIDER FOR PIPES CONVEYING SOLIDS

BACKGROUND OF THE INVENTION

The present invention relates to a pipe divider for pipes conveying solids of small particle size, comprising a feed pipe, a distributor chamber, and two distributor pipes.

Pipe dividers of this type are known and play an important role in the distribution of solids which are to be conveyed over at least two pipes. However, the substances or substance mixtures to be distributed frequently still contain components which can have a more or less aggressive behavior toward the materials of which these pipe dividers or components thereof are composed in practice. For example, these substances or substance mixtures can, for reasons of production engineering, still contain acids, bases or salts, which can then attack and corrode metals. If, for example, due to the failure of seals, reduced mobility of components or the appearance of holes, such pipe dividers which have become unserviceable must be replaced, this represents not only a cost factor due to the replacement of material but also a possible idling of production units, which today frequently operate continuously. The state of the art has disclosed, for example, the following pipe dividers:

German Auslegeschrift No. 11 65 493 describes a pipe divider for the pneumatic conveyance of dusty or grainy material. The divider has the form of a bifurcated pipe and contains a ball, movable with play, provided as a sealing shut-off means.

German Auslegeschrift No. 12 44 055 discloses a two-way diaphragm divider for solids-laden liquid streams or gas streams, wherein two diaphragm sections, which can be subjected to compressed air for isolating one branch route or the other at will, are provided in the divider housing on both sides of the branching point.

The pipe branch for pneumatic conveying units disclosed by German Auslegeschrift No. 12 50 346 is constructed in such a way that a feed pipe leads into a distributor chamber, from which a plurality of distributor pipes lead away, each distributor pipe having a shut-off means (valve). Cleaning-air nozzles directed onto points with a particularly high risk of deposits lead into the distributor chamber.

German Offenlegungsschrift No. 14 81 189 describes a line system for pneumatic conveying of solids in a carrier gas, which system has one inlet line and at least two outlet lines. Each of the outlet lines contains a valve which is arranged at a certain distance from the branching between the inlet and outlet lines and, in the blocking state, causes the formation of a plug of the solid between the valve and the branch. The plug of solids is removed from the line either automatically when the valve is opened or by means of a flushing gas which is introduced into the system via a flushing gas inlet between the branching and the valve.

German Pat. No. 15 56 320 and No. 17 81 388 disclose a revolving pipe divider for connecting an incoming pipe to one of several outgoing pipes via a revolving pipe, the outlet end of which is connected to the edge zone of a rotary disk, for pivoting about the axis of the inlet pipe.

The pipe divider for the pneumatic conveying of chemically corrosive dusty or grainy materials according to German Offenlegungsschrift No. 19 16 581 comprises a hollow cylindrical housing and a cylindrical cock which is rotatably arranged within the housing. A material feed line and at least two material discharge lines terminate within the shell surface of the housing. The cock of cheap cast material (for example, cast aluminum) contains channels which are formed by pipes of a resistant material (for example, chromium-nickel steel). The other components, coming into interaction with the material of the pipe divider are also made of a resistant material. Additionally, inflatable tubing rings can also be provided for sealing.

Under the demands of practice, however, these pipe dividers still have problems, in particular if the solids to be conveyed and distributed are still moist, so that they tend to cake and/or to stick, or if the solids or dispersion still contain corrosive components. Very frequently, for example, blockages occur in the distributor pipes, or the shut-off means no longer close tightly. It has not been possible hitherto to overcome these problems completely, even by the use of tubing diaphragms, since the latter are very highly stressed mechanically by the solid particles impinging on them in the known arrangements, so that frequent dismantling and refitting or replacement of the pipe dividers are still necessary.

SUMMARY OF THE INVENTION

It is therefore an object of the present invention to provide a pipe divider particularly suitable for distributing those solids which still contain components which are corrosive or tend to cake or stick.

It is a further object of the invention to produce a pipe divider which operates without the occurrence of high mechanical or chemical stress on the functional components.

Still another object of the invention is to produce a pipe divider arranged so as to prevent blockages of the distributor pipes in the pipe section up to the shut-off means.

In accomplishing the foregoing objects, there has been provided in accordance with the present invention a pipe divider for pipes used to convey solids of small particle size, comprising a cylindrical distributor, two distributor pipes, each including shut-off means, leading away from the chamber, and a feedpipe leading tangentially into the chamber. Also provided are means for preventing the blocking of the distributor pipes, comprising continuous inwardly-curved weirs which project from inside the end faces of the cylindrical chamber in the direction of the center of the chamber and surround the outlet points to the distributor pipes. In such a pipe divider, it is preferable that the distributor pipes lead axially away from the ends of the distributor chamber, but they may be subsequently oriented such that the material leaves the distributor pipes in a direction corresponding to the inlet direction.

Further objects, features, and advantages of the present invention will become apparent from the detailed description of preferred embodiments which follows, when considered with the attached drawings.

DETAILED DESCRIPTION OF PREFERRED EMBODIMENTS

Figure 1:
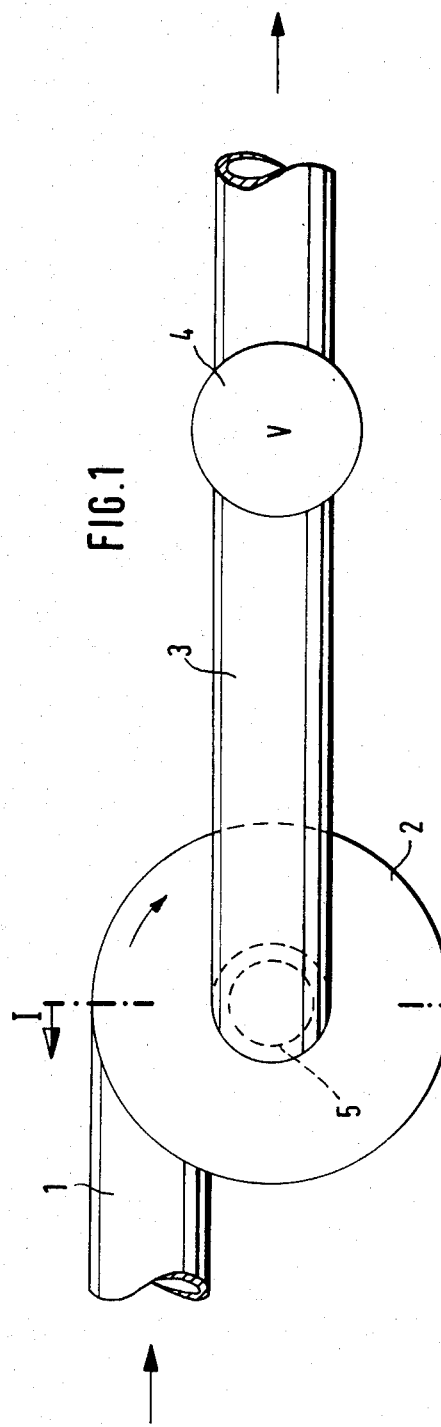
FIG. 1 is a side view of a pipe divider according to the invention.
Figure 2:
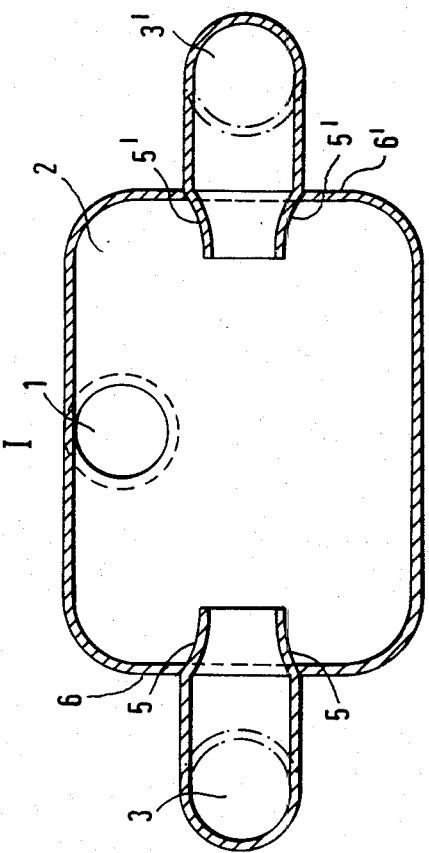
FIG. 2 is a cross-section through the pipe divider at a level of the line I—I in FIG. 1.
Figure 3:
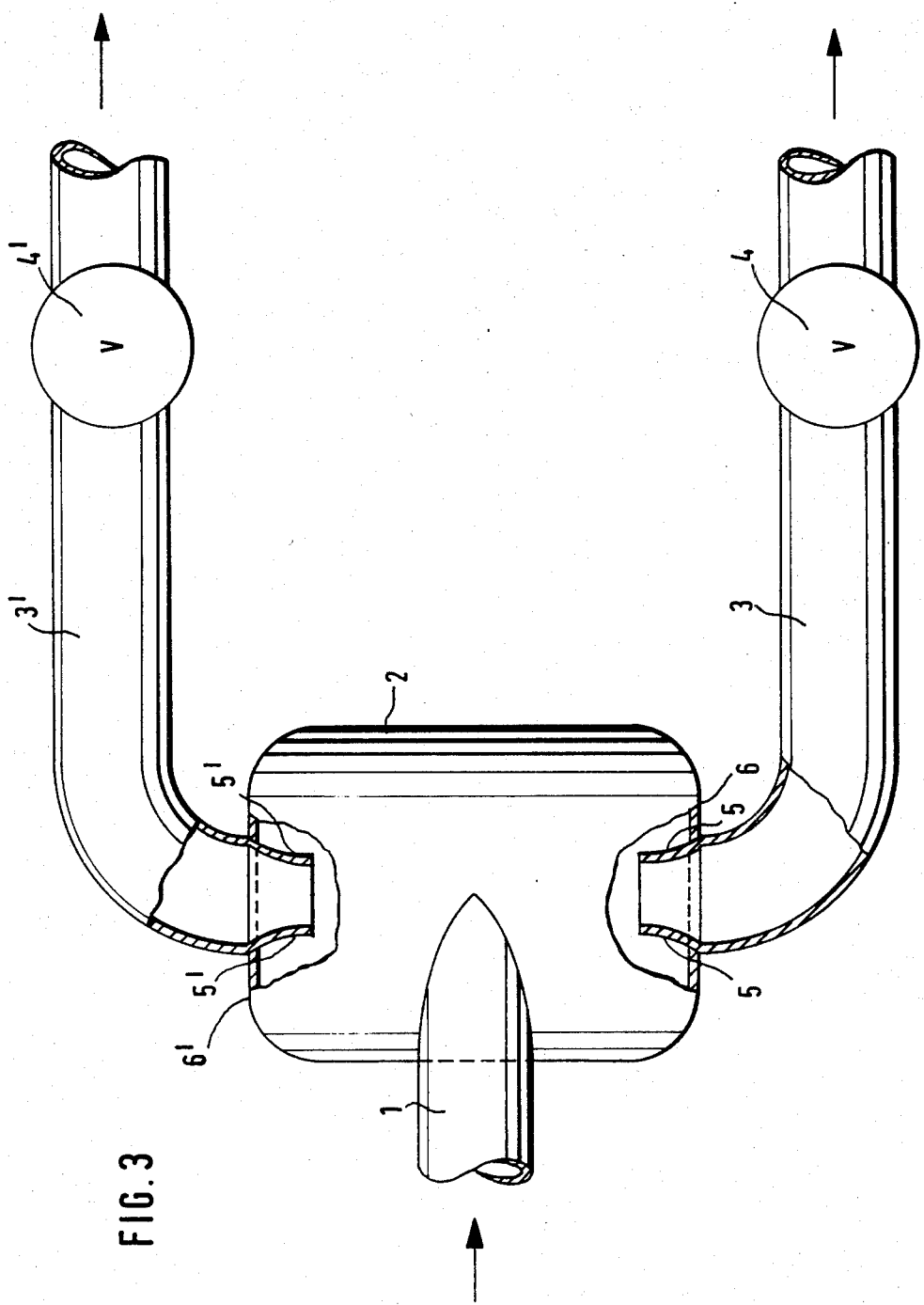
FIG. 3 is a plan view of the pipe divider, partly in section.

The present invention relates to a pipe divider for pipes for conveying solids of small particle size, such as pulverulent methylhydroxyethyl cellulose from an intermediate stage of a production plant, having a content of about 55 to 60% by weight of dry matter, a moisture content of about 40 to 45% by weight, which moisture content comprises essentially water, but can also still contain fractions of organic solvents, such as alcohols, or acids or bases, and a salt fraction in the dry matter of about 1 part by weight per part by weight of active ingredient. According to the present invention, a feed pipe leads tangentially into a substantially cylindrical distributor chamber, and two distributor pipes, each having a shut-off means, lead away from this chamber. In preferred embodiments, the cylindrical distributor chamber has continuous, inwardly-curved weirs around the outlet points to the distributor pipes, and a distributor pipe leads away from each of two end faces which define the lateral walls of the cylindrical distributor chamber.

In this connection, the term "tangentially" means that the center axis of the feed pipe forms an angle of about 90° with a section plane which passes along the axis through the distributor chamber, or that an imaginary continuation of the upper contour line of the feed pipe in the direction of the distributor chamber forms a tangent to (or very closely approaches) the periphery of the distributor chamber. In particular, the feed pipe is arranged in such a way that the center axis of the pipe forms an angle of about 90° with the vertical section plane along the axis through the distributor chamber. In practice, this tangential arrangement of the feed pipe relative to the cylindrical distributor chamber has the effect that the material which is to be conveyed, composed of solids of small particle size, for example, granules, power or very fine powder which can also contain moisture and/or by-products, circulates in the distributor chamber on a circular or helical path, moving essentially along or in the vicinity of the inner wall of the distributor chamber. If one of the two shut-off means (for example, valves) is closed, the material entering the distributor chamber is deflected in the direction of the other, free branch path. In this case, the material which also initially enters the part of the distributor chamber within the blocked branch path constitutes a barrier composed of the material itself, forming a kind of "product ring." In the preferred embodiment, with continuous, inwardly-curved weirs around the outlet points of the distributor chamber to the distributor pipes, this arrangement can completely prevent blockage (packing) of the distributor pipes in the pipe section up to the shut-off means.

Long-term trials unambiguously show that the pipe divider according to the present invention functions trouble-free, without the occurrence of high stresses on the functional components. This is because, unlike the state-of-the-art dividers, the divider of the present invention has the advantage that those of its components which effect the distributing function are mechanically and/or corrosively stressed in practice only slightly or not at all.

An illustrative embodiment of the pipe divider according to the invention is shown in the drawings. The material to be conveyed and distributed, for example, pulverulent methyl-hydroxyethylcellulose as mentioned above, is fed through a feed pipe 1 tangentially into a cylindrical distributor chamber 2. The material is discharged from the distributor chamber 2 through the two distributor pipes 3,3' which lead away at right angles from the two end faces 6,6' of the distributor chamber 2. Subsequently, the path of the outlet pipes 3,3' is such that the material leaves the pipe divider generally in a direction corresponding to the inlet direction; however, different output directions from the distributor chamber 2 or for the outlet pipes 3,3' are also possible, depending on the particular operating requirements. The distributor chamber 2 has a continuous, inwardly-curved weir 5,5' around each of the outlet points to the distributor pipes 3,3'. To control the direction of distribution, i.e., to determine the particular branch path, the distributor pipes 3,3' each contain a shut-off means (for example, a pinch valve) 4,4'. p As a result of closing the left-hand shut-off means 4, the "product ring" thus formed in the left-hand part of the distributor chamber 2 from the tangentially entering material blocks the path of additional entering material through the distributor pipe 3, while the right-hand branch path through the distributor pipe 3' is free. Conversely, closure of only the right-hand shut-off means 4' would block the right-hand branch path, and the left-hand branch path will be free. If both shut-off means 4,4' are closed, both branch paths are blocked, and when both shut-off means 4,4' are opened, both branch paths are free. The material used for the pipes and the distributor chamber can be stainless steel. About 4 to 6 tons per hour of the crude cellulose ether can be conveyed and distributed by means of a pipe divider in which the pipes have an internal diameter of 100 mm and the distributor chamber has an internal diameter of 300 mm.

What is claimed is:

1. A pipe divider for pipes which are intended for conveying solids for small particle size, comprising:
   (a) a distributor chamber comprising a substantially axially extending enclosed space having generally curved side walls;
   (b) a feed pipe running essentially tangentially into said chamber;
   (c) at least two distributor pipes communicating with said chamber;
   (d) means for preventing blockage of said distributor pipes; and
   (e) shut-off means, located in each of said distributor pipes for selectively closing said distributor pipes to flow, wherein said means for preventing blockage of the distributor pipes comprises a radially inwardly-curved weir around the inlet point to each of said distributor pipes.

2. A pipe divider as in claim 1, wherein at least one first distributor pipe communicates with said chamber at a location which is substantially opposite from the location where at least one second distributor pipe communicates with said chamber.

3. A pipe divider as in claim 2, wherein an imaginary continuation of the axes of said distributor pipes in the direction of said chamber are parallel to and approximately coaxial with the axis of said chamber.

4. A pipe divider as in claim 2, wherein a continuation of said distributor pipes is such that the axes of said continuations run approximately parallel to the axis of said feed pipe.

5. A pipe divider as in claim 1, wherein said distributor chamber presents a substantially cylindrical profile.

6. A pipe divider as in claim 5, wherein said distributor further comprises a face plate rigidly secured to each end of said chamber.

7. A pipe divider as in claim 6, wherein each of said first and second distributor pipes inserts through a face plate to provide a projection into said enclosed space.

8. A pipe divider as in claim 6, wherein said distributor pipes form approximately 90° angles with the face plate.

9. A pipe divider as in claim 1, wherein each of said weirs is continuous around the inlet point to each distributor pipe.

* * * * *

UNITED STATES PATENT AND TRADEMARK OFFICE
CERTIFICATE OF CORRECTION

PATENT NO. : 4,536,104
DATED : Aug. 20, 1985
INVENTOR(S) : Theodor BUNGERT

It is certified that error appears in the above-identified patent and that said Letters Patent is hereby corrected as shown below:

ON THE TITLE PAGE:

IN THE BIBLIOGRAPHICAL DATA:

At item [57] INVENTOR: Kindly correct the inventors name to read -- BUNGERT -- .

*Signed and Sealed this*

*Third* Day of *December 1985*

[SEAL]

*Attest:*

DONALD J. QUIGG

*Attesting Officer*     *Commissioner of Patents and Trademarks*